United States Patent [19]

Hatton et al.

[11] Patent Number: 4,958,743

[45] Date of Patent: Sep. 25, 1990

[54] CLOSE OUT FITTING

[76] Inventors: Randall C. Hatton, 3910 Middlegate St., Westlake, Calif. 91361; Gerald W. Tyree, 8870 O'Melveny, Sun Valley, Calif. 91352

[21] Appl. No.: 357,628

[22] Filed: May 18, 1989

Related U.S. Application Data

[63] Continuation of Ser. No. 132,760, Dec. 14, 1987, abandoned.

[51] Int. Cl.$^5$ .............................................. B65D 41/04
[52] U.S. Cl. ...................................... 220/288; 29/460; 29/512; 29/523; 138/89; 220/307; 244/131; 244/135 R; 403/265; 403/288; 411/34
[58] Field of Search ................... 29/509, 522.1, 522.2, 29/523, 512, 460; 138/89, 91; 220/307, 288; 403/288, 265; 244/131, 135 R; 411/34, 35, 173, 177, 183, 500, 501, 504, 506; 137/247.47, 247.51

[56] References Cited

U.S. PATENT DOCUMENTS

| | | | |
|---|---|---|---|
| 309,975 | 12/1884 | Nicolai | 138/89 |
| 698,217 | 4/1902 | Newton | 220/288 X |
| 1,136,698 | 4/1915 | Mittinger | 220/288 |
| 1,233,385 | 7/1917 | Maurer | 138/89 X |
| 2,466,013 | 4/1949 | Eaton | 411/34 |
| 2,574,160 | 11/1951 | Zimmerman | 229/288 |
| 2,801,061 | 7/1957 | Logan | 244/135 R |
| 2,836,918 | 6/1958 | Pula et al. | 138/89 X |
| 2,936,810 | 5/1960 | Franck | 153/81 |
| 3,263,466 | 8/1966 | Shackelford | 72/114 |
| 3,653,294 | 4/1972 | Mason | 411/34 |
| 3,866,914 | 8/1972 | Powsey | 72/114 |
| 3,983,904 | 10/1976 | Laniano | 138/89 |
| 4,400,960 | 8/1983 | Martin | 12/114 |
| 4,646,816 | 3/1987 | Rothstein | 138/89 X |
| 4,751,944 | 6/1988 | Sinha et al. | 138/89 |

FOREIGN PATENT DOCUMENTS

| | | | |
|---|---|---|---|
| 256108 | 8/1926 | United Kingdom | 220/288 |
| 301297 | 11/1928 | United Kingdom | 220/288 |
| 326325 | 3/1930 | United Kingdom | 244/131 |

*Primary Examiner*—Charlie T. Moon

[57] ABSTRACT

The invention is a close out fitting for installing in a structural element, the structural element having a port extending from a first surface to a second surface thereof, the port countersunk at both ends, and a method of installing the closeout fitting. In detail, the fitting comprises a hollow, tubular sleeve having a flared first end, a flarable second end and internal threads therebetween. The fitting further comprises a plug having a head portion and a shank portion attached to the head portion with the shank portion having external threads. The method of installing the close out fitting comprises the steps of forming a port through the structural elements, countersinking both ends of the port, providing a hollow sleeve having a flared first end and flarable second end and internal threads therebetween, installing the sleeve in the port such that the flared first end is in contact with one of the countersink ends of the port and the flarable second end extends into the other countersink end of the port, flaring the second end of the sleeve into contact with the other countersink end of the port locking the sleeve into the port, providing a plug having a head and a shank with the shank having external threads thereon, and installing the plug into the sleeve.

4 Claims, 2 Drawing Sheets

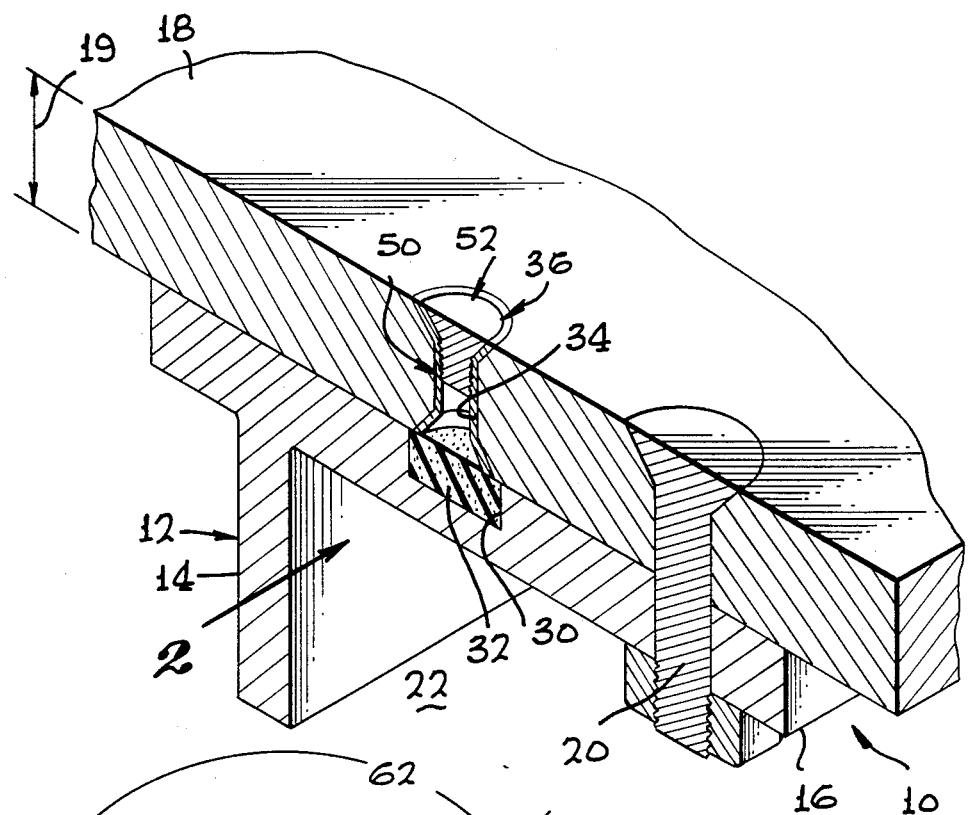
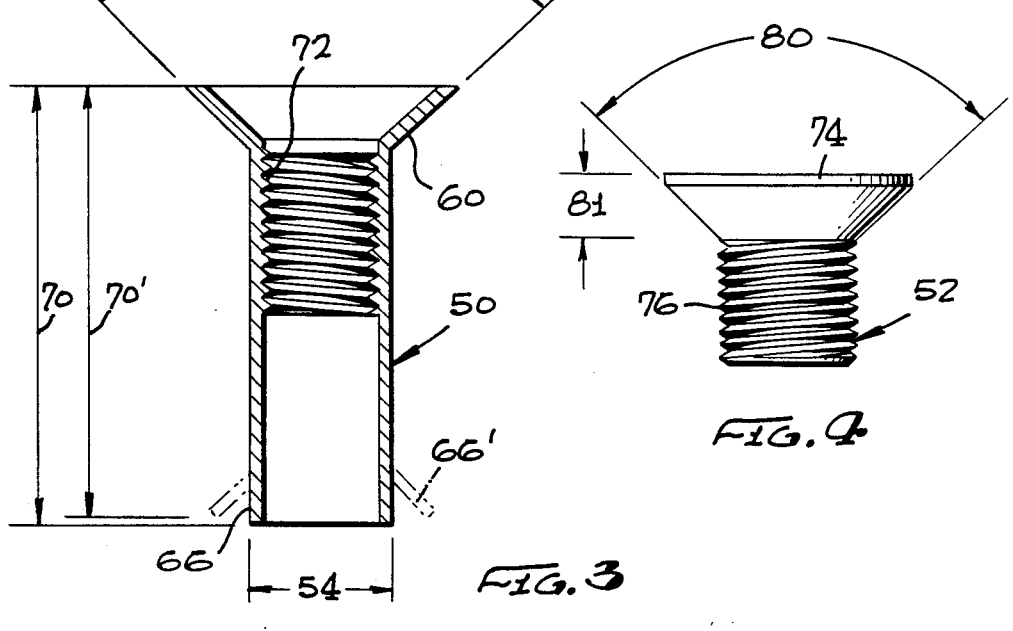

CLOSE OUT FITTING

This is a continuation of co-pending application Ser. No. 07/132,760 filed on Dec. 14, 1987, now abandoned.

TECHNICAL FIELD

The invention relates to the field of fasteners and, in particular, to flush mounted close out fittings for sealant injection ports in aircraft and the like.

BACKGROUND INFORMATION

Most modern aircraft use integral fuel tanks. Thus, complicated and irregular structural joints must be sealed to prevent fuel leakage. In the past, sealing was accomplished by hand spraying or by use of grease gun type applicators. These application methods apply sealants in amounts far and above that required for actually accomplishing the seal. Another approach is to use preformed seals in grooves, for example, in spar cap to wing skin joints. However, such preformed seals are expensive and field repair is difficult to accomplish. Another approach is to fill a sealant groove with sealant after assembly via close out ports. Such an approach has several advantages: (1) sealant is applied in exactly the right place, (2) the amount of sealant required is kept to an absolute minimum, and (3) only a small number of ports are necessary, many of which can be externally located. An additional advantage is that upon resealing, the tanks need not be completely drained and cleaned.

However, the use of such close out ports require some method of sealing of the port after the grooves are filled. One approach is to use a flush head internally threaded bushing pressed into a port. A sealant applicator is threaded into the bushing and is used to inject the sealant under pressure on the order of 10,000 PSI. After filling of the groove a threaded plug is inserted into the bushing. However, such bushings depending upon a press fit and can work loose. Because the bushings are not designed to completely line the port they can cause severe problems when used in composite structures. A composite material is typically formed of layers of filamentary material in a resin matrix and the drilling of the port in the structure necessarily exposes these layers of filamentary material. Upon injection of the sealant under high pressure, delamination of the layers may occur, severely weakening the structure in the immediate area of the port.

Thus, it is a primary object of the subject invention to provide a close out fitting that is mechanically locked in place.

It is another object of the subject invention to provide a close out fitting that completely lines the port wall to prevent sealant from reaching the adjacent structure.

Another object of the subject invention is to provide a close out fitting that is flush to both surfaces.

DISCLOSURE OF THE INVENTION

The invention is a close out fitting for installation in a structural element, the structural element having a port countersunk on both its ends and extending from a first surface to a second surface thereof. A typical application for such a fitting is in the sealing of wing fuel tanks of aircraft; for example, to provide access to a sealing groove in a wing spar cap through the skin of the wing; thus allowing sealant to be injected into the groove after the joining of these structural elements together.

In detail, the close out fitting comprises a hollow tubular sleeve having a flared first end, a flarable second end and internal threads therebetween. The fitting further includes a plug having a head portion and a shank portion attached thereto with the shank portion having external threads. The sleeve is installed into the hole with the flared first end in contact with one of the countersunk ends of the hole and the flared second end extending into the other one of the countersunk ends so that it can be subsequently flared into contact therewith. Thereafter, the plug can be threadably engaged with the sleeve sealing the two surfaces from each other. Thus, in order to apply sealant to the sealing groove in the wing spar cap, the plug is removed and an injector is threadably engaged in the internal threads of the sleeve and thereafter sealant can be injected into the groove under high pressure. Preferably, the length of the sleeve is selected such that upon installation into the port and after the flarable second end is flared the length of the sleeve is substantially equal to the length of the hole. Preferably the countersink ends have total included angles of between 99 degrees and 101 degrees and the flared end of the sleeve has a total included angle equal thereto. The plug is a flush-head screw having a conically shaped underhead also with the same total included angle.

Thus, the method of installing the close out fitting in the structural element comprises the steps of: (1) forming a port through the structural element, (2) countersinking both ends of the port (3) providing a hollow sleeve having a flared first end and a flarable second end and internal threads therebetween, (4) installing the sleeve in the port such that the flared first end is in contact with one of the countersunk ends of the port and the flarable second end extends into the other countersunk end of the port, (5) flaring the flarable second end of the sleeve into contact with the other countersunk end of the port locking the sleeve in place (6) providing a plug having a head and a shank, with the shank having external threads and (7) installing the plug into the sleeve.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a partial perspective view of a portion of a wing fuel tank with the wing spar and skin broken away to show the installation of the close out fitting.

Illustrated in FIG. 2 is an enlarged view of a portion of FIG. 1 taken along the arrow indicated by numeral 2.

Figure 2:
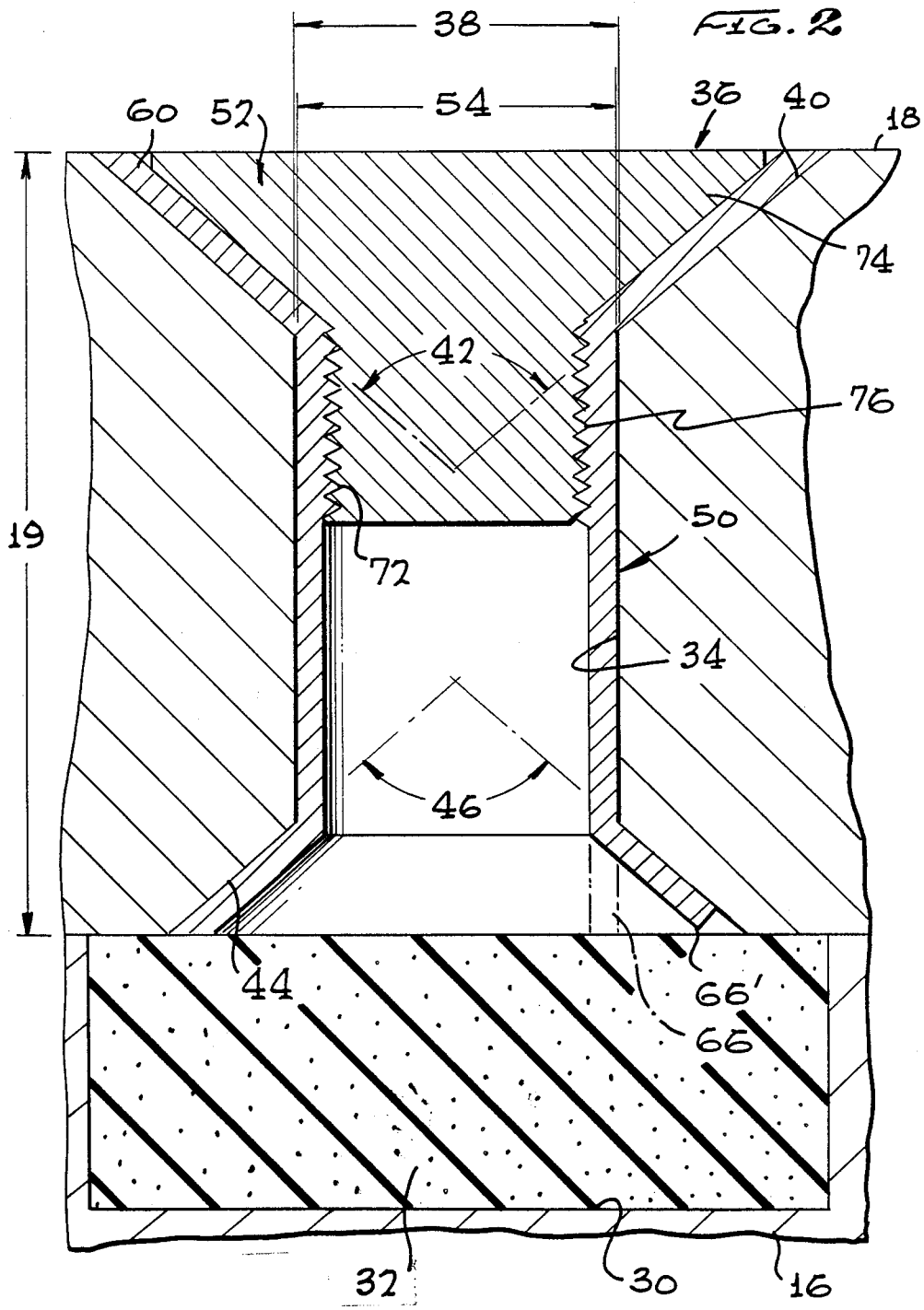

Illustrated in FIG. 3 is a cross-sectional view of the sleeve portion of the close out fitting prior to installation.

Illustrated in FIG. 4 is a cross-sectional view of the plug portion of the close out fitting.

BEST MODE FOR CARRYING OUT THE INVENTION

Illustrated in FIG. 1 is a simplified partial perspective view of an aircraft wing structure with integral fuel tanks, while illustrated in FIG. 2 is an enlarged view of a portion of the wing structure shown in FIG. 1 taken along the arrow 2. Referring to FIG. 1 and 2 it can be seen that wing structure, generally indicated by numeral 10, includes a spar 12 including a vertical web 14 and spar cap 16. A wing skin 18 having a total thickness indicated by numeral 19 is fastened to the spar cap 16 by means of a plurality of fasteners 20. This structure defines a portion of the integral fuel tank indicated by numeral 22. In order to seal the fuel tank 22 a groove 30 is provided in the spar cap 16 which is filled with a sealant 32. The sealant 32 is injected under high pressure into the groove 30 via a sealant injection port 34 having the subject close out fitting 36 installed therein. The port 34 having a diameter 38, extends through the skin 18 and includes a top countersink portion 40 with a total included angle 42 and a bottom countersink portion 44 in contact with the groove 30 having a total included angle 46. Preferably these angles 42 and 46 are between 99 degrees and 101 degrees.

The close out fitting 36 includes a sleeve 50 and a flush-head plug 52 which are illustrated in cross-section in FIGS. 3 and 4, respectively. Still referring to FIGS. 1 and 2 and additionally to FIGS. 3 and 4 it can be seen that the sleeve 52 has a diameter 54 slightly smaller than the diameter 38 of the port 34 so as to fit snugly therein or alternately with a slight interference fit. The sleeve 50 further includes a first flared end portion 60 having a total included angle 62 substantially equal to the total included angle 42 of the countersink portion 40 of the port 34. The sleeve 50 further includes a flarable second end portion 66 having a length such that when the sleeve 50 is installed in the port 34 the flarable second end portion 66 can be flared to match and mate with the countersunk portion 44 (shown in dotted lines and indicated by numeral 66' in FIG. 3 and shown in solid lines in FIG. 2). The overall length 70 of the sleeve 50 is such that when the sleeve 50 is installed in the port 34 and the flarable end portion is flared 66', the then overall length indicated by numeral 70' is substantially equal to the length 19 of the port 34 (the thickness of the wing skin 18). The flaring can be accomplished by means of a conventional flaring tool (not shown) prior to the joining of the skin 18 to the spar cap 16. Finally, the sleeve 50 includes internal threads 72 for receiving the plug 52.

The plug 52 (best seen in FIG. 4) is a flush-head fastener having a head 74 and a threaded shank 76. The head 74 has a conically shaped underhead portion 76 with a total included angle 80 substantially equal to the total included angle 40 of the countersink portion 38 (preferably 90 degrees to 101 degrees). The height 81 of the head is selected so that it is flush with the flared end portion 60 when installed in the sleeve 50.

Note that with the plug 52 removed from the sleeve 50, a sealant gun (not shown) can be threadably engaged with the sleeve and sealant, under high pressure, can be injected into the groove 30. Since the flarable portion 66 is flared (66') it is forced into the countersunk portion 34 effectively sealing off the port wall and sealant cannot be forced into the layers of the composite material of the wing. Furthermore, the sleeve being permanently attached to the wing skin it cannot work loose as could happen with an interference fit plug.

While the method of installing the close out fitting has been generally described it is appropriate that the individual steps be enumerated. (1) forming a port (34) through the structural element (18), in this case the wing skin, (2) countersinking (40, 44) both ends of the port (34), (3) providing a hollow sleeve (50) having a flared first end (60) and a flarable second (66) and internal threads (72) therebetween, (4) installing the sleeve (50) in the port (34) such that the flared first end (60) is in contact with one of the countersink ends (40) of the port (38) and the flarable second end (66) extends into the other countersink portion (44), (5) flaring the second end (66) of the sleeve into contact with the other countersink end (44) of the port (38) locking the sleeve (50) in place, (6) providing a plug (52) having a head (74) and a shank (76) with the shank having external threads (76) and (7) installing the plug (52) into the sleeve (50).

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention is applicable to all machinery and structures where a sealable port is required.

We claim:
1. In a structure, the combination of:
   a structural element, the structural element having a material injecting port extending from a first surface to a second surface thereof, said port countersunk at both its ends;
   a hollow tubular sleeve installed in said port, said sleeve having flared ends in contact with said countersunk ends of said port, and flush with said first and second surfaces of said structural element, a length equal to the length of said port and internal threads located between said flared ends; and
   a plug having external threads in removable engagement with said internal threads of said sleeve.
2. The combination as set forth in claim 1, wherein said sleeve includes a solid wall providing a barrier between said port wall and the interior of said sleeve.
3. The combination as set forth in claim 2, wherein said plug comprises:
   a head portion, the length of said head portion being generally equal to or less than the length of said flared ends of said sleeve; and
   a shank portion attached to said head portion, said shank portion having said external threads thereon.
4. The combination as set forth in claim 3, wherein the countersunk ends of said port have total included angles and said sleeve further including;
   said flared ends of said sleeve having a total included angle substantially equal to said total included angle of said countersunk ends of said port; and
   said head portion of said plug having a conically shaped underhead with a total included angle substantially equal to said total included angle of said countersunk ends; and the height thereof is substantially equal to the length of said flared end portions of said sleeve.

* * * * *